No. 746,801. Patented December 15, 1903.

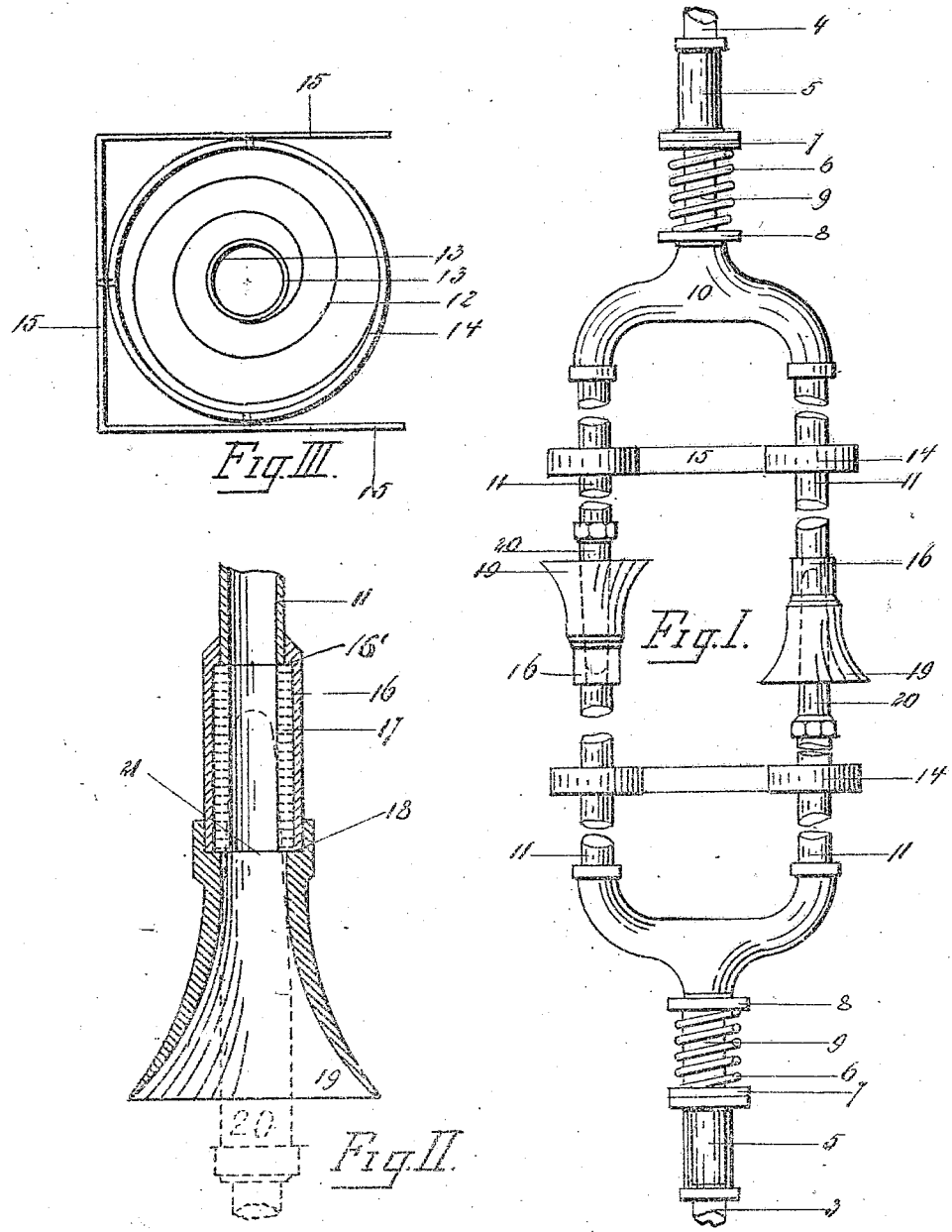

UNITED STATES PATENT OFFICE.

THOMAS M. D. EARHEART, OF PARKWOOD, ALABAMA.

AUTOMATIC AIR-COUPLING FOR CARS.

SPECIFICATION forming part of Letters Patent No. 746,801, dated December 15, 1903.

Application filed October 7, 1902. Serial No. 126,288. (No model.)

*To all whom it may concern:*

Be it known that I, THOMAS M. D. EARHEART, a citizen of the United States, residing at Parkwood, in the county of Jefferson, State of Alabama, have invented a new and useful Appliance in Automatic Coupling for Air-Pipe Lines, of which the following is a specification.

This invention relates to pipe-couplings for air-brakes, and has for its object to provide a device of this nature which will operate automatically and which will form a tight union between the sections of pipe. Further objects and advantages will be apparent from the following description.

In the drawings forming a portion of this specification, and in which like numerals of reference indicate similar parts in the several views, Figure 1 is a view of the device, showing the two members of the coupler in engagement. Fig. 2 is a sectional view of the nozzle, and Fig. 3 is a detail view of the supporting-frame.

Both members of the coupler being the same, a description of one will suffice for both.

Referring now to the drawings, each member of the present invention comprises a sleeve 5, to which is connected the air-pipe 3 of the line and which has at one of its ends a packing-gland 7. Within the sleeve 5 there is disposed a pipe 9, carrying a flange 8, the pipe being slidably disposed within the sleeve 5, the packing-gland preventing leakage of air between the pipe and sleeve. Upon the pipe 9, encircling the same and bearing at its ends upon the flange 8 and gland 7, respectively, is a helical spring 6, which holds the flange and gland yieldably in spaced relation.

To the pipe 9 is attached a U-shaped pipe 10, the arms of which have pipes 11 connected therewith and forming continuations thereof. One of these pipes 11 terminates in a tapering nozzle 20, having an opening in the end thereof for the passage of air, while to the other pipe 11 there is attached the device shown in Fig. 2 of the drawings. This device consists of a sleeve 16, having a reduced portion at one of its ends, resulting in a shoulder 16', which is disposed with its reduced portion upon the end of the pipe 11, the end of said pipe lying flushed with the shoulder and forming a continuation thereof. Lying within the sleeve 16, with its inner end against the shoulder 16' and the end of the pipe 11, is a short section of rubber pipe 17, the passage through which is of substantially the same size as that of the pipe 11, and engaged upon the outer end of the sleeve 16 is a bell 19.

In mounting the two members upon the cars they are so disposed that when brought together the nozzle of one member will register with and enter the bell of the other member, the tapering nozzles entering and firmly wedging into the rubber tubes 17, where they will be held by the tension of the spring 6.

To hold the device to the under side of the car, the construction shown in Fig. 3 is used. This consists of a frame 15, which is screwed or otherwise fastened to the under side of the car and which carries a ring 14, as shown. To this ring there is attached the outer end of a coil-spring 12, which lies within the ring and has attached to its inner end a smaller ring 13, the ring 13 thus lying normally concentric with the outer ring 14. Two of these hangers are provided for each member of the coupler and are disposed with the rings 13 encircling the pipes 11. This arrangement permits of lateral and vertical movement of the members to allow for any difference in the positions of the members upon the bottoms of the cars or for unevenness in the tracks which would prevent registration of the nozzles and bells.

What is claimed is—

1. A coupling for air-brake pipes comprising two members each comprising spaced arms and a connecting-bight, said arms and bight having a passage therethrough to convey air, one of said arms having a tapering nozzle at its end and the other carrying a bell, and a resilient lining within the stem of the bell, the nozzle of one being adapted to register with the bell of the other member and to wedge tightly within the lining thereof.

2. In a coupling for air-brake pipes, the combination with a car, of a pair of hangers attached to the under side of the floor thereof, said hangers comprising rings, coil-springs disposed within the rings and attached at their outer ends thereto, lesser rings attached to the inner ends of the springs, pipes disposed within the lesser rings and connected with an air-supply, a tapering nozzle upon the end of one of said pipes, the other pipe being flared at its end, and a resilient lining within the flared end, the nozzle and the flared end being adapted for registration with the flared end and nozzle respectively, of a similar device attached to another car.

THOMAS M. D. EARHEART.

Witnesses:
ROBT. L. BAINS,
WILLIAM H. DE LACY.